Jan. 3, 1933.  F. T. COURT  1,893,069
TRACTOR DRIVEN CULTIVATOR
Original Filed Sept. 27, 1926   3 Sheets-Sheet 1
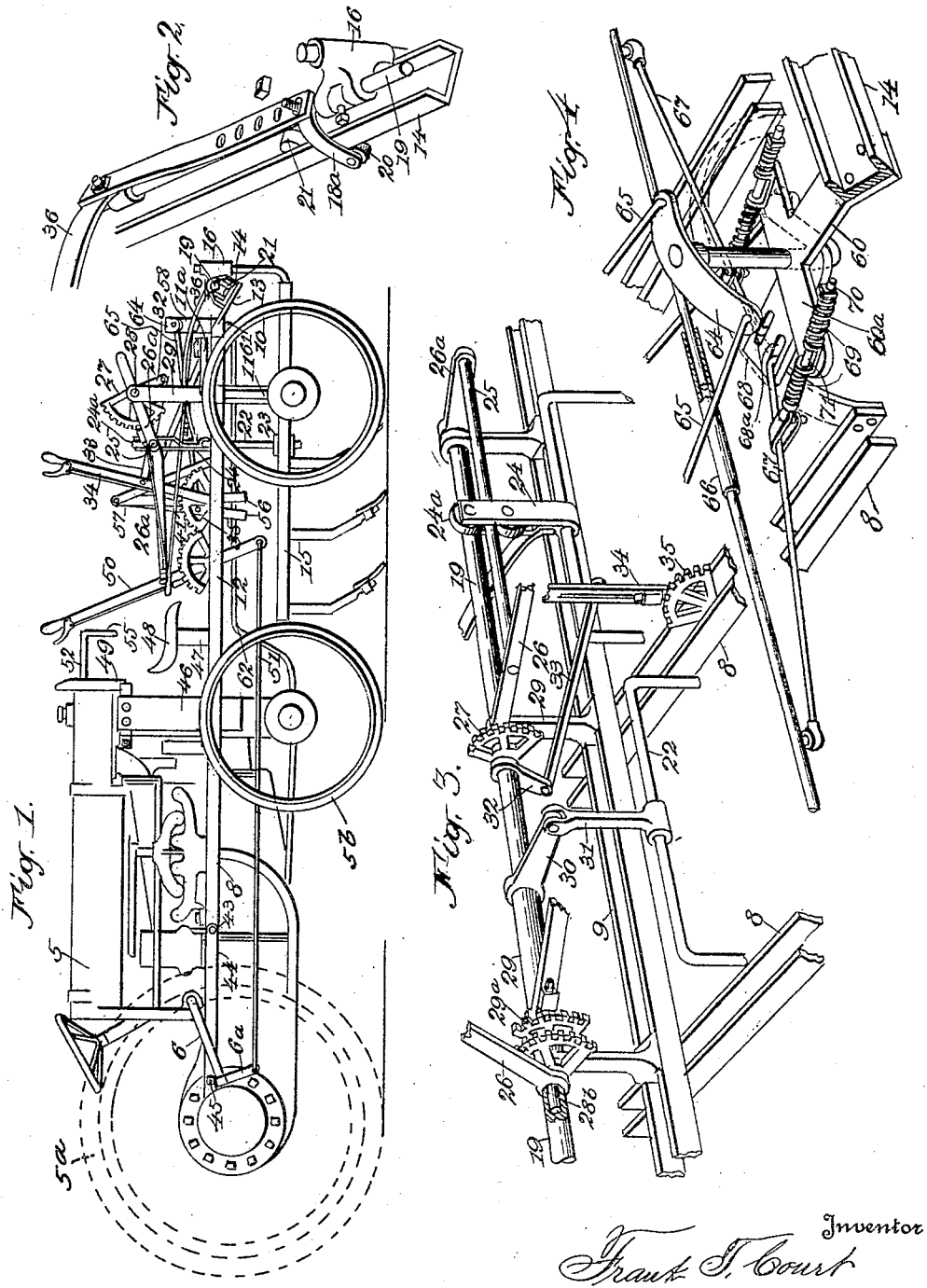
Inventor
Frank T. Court
By J. M. St. John
Attorney

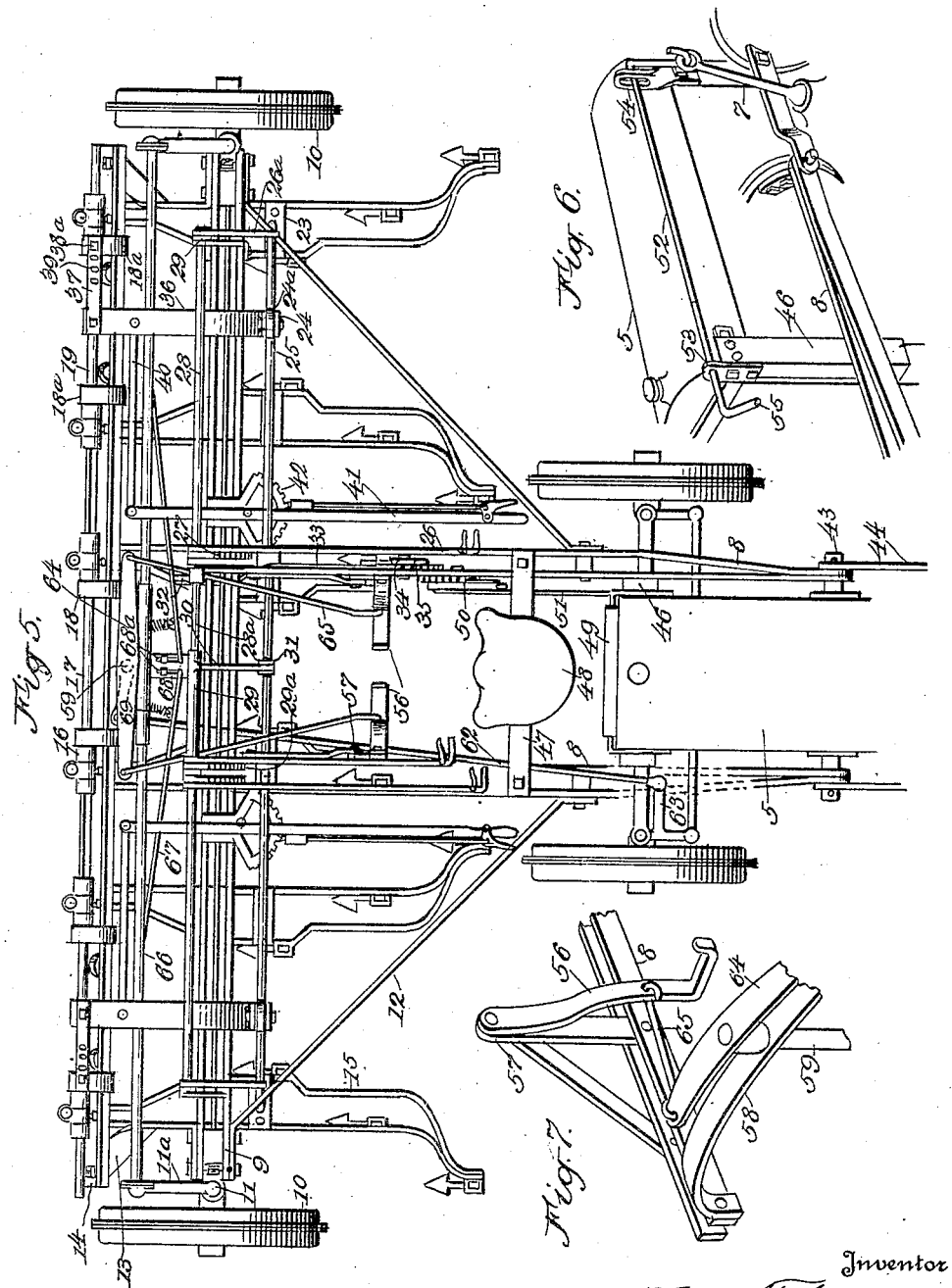

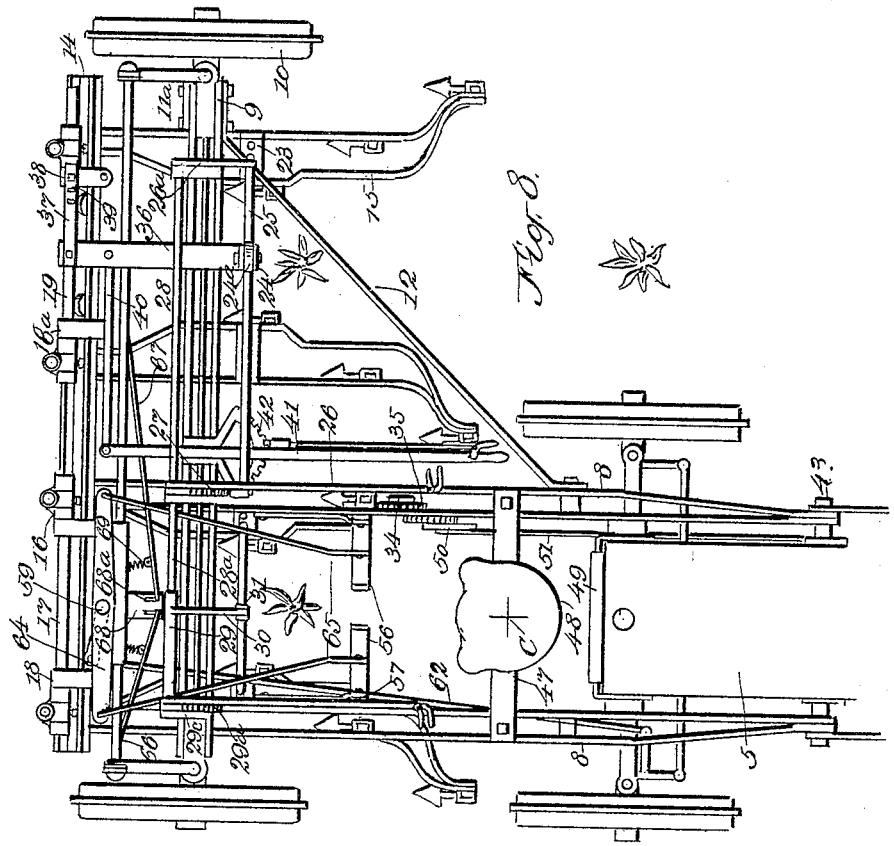
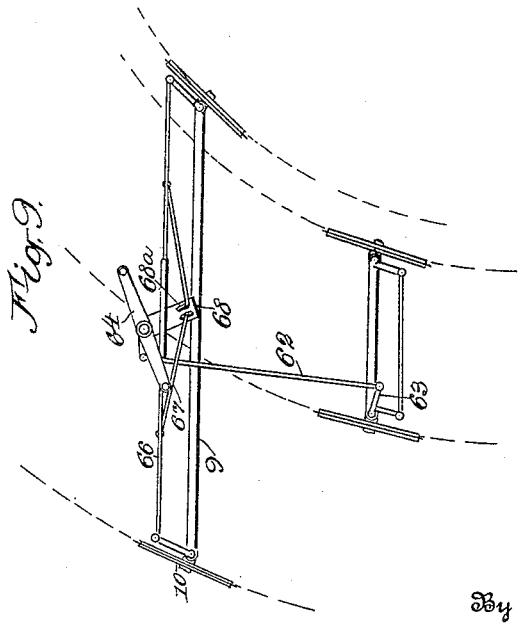

Patented Jan. 3, 1933

1,893,069

UNITED STATES PATENT OFFICE

FRANK T. COURT, OF MOLINE, ILLINOIS, ASSIGNOR TO COURT TRACTOR EQUIPMENT COMPANY, OF INDEPENDENCE, IOWA, A CORPORATION OF IOWA

TRACTOR-DRIVEN CULTIVATOR

Application filed September 27, 1926, Serial No. 137,985. Renewed March 15, 1929.

This invention relates to gang cultivators driven by a tractor, and herein shown as adapted for the cultivation of three rows of corn simultaneously, or, by a slight modification in construction, being adapted for the cultivation of two rows.

One object of the invention is to provide for pushing an implement, in the form of an attachment adapted to be connected in front of the tractor, with such a construction and arrangement of mechanism as will enable a single operator to manage both the tractor and the cultivator.

Another object is to provide mechanism whereby the operator may easily and positively guide both the tractor and the implement, either straight-away or in turning, the traction of the guide-wheels in either case conforming to the proper lines of advance of the several guide-wheels.

In the operation of plowing corn especially, with a tractor as the propulsive power, it is desirable to place the cultivator in front of the tractor. The arrangement gives the operator better control of both the tractor and the implement, by reason of direct connection of levers with the parts to be controlled. What is of even more importance is the fact that an implement forward of the tractor is very much more sensitive to the lateral controls than when drawn behind the tractor. It thus becomes easy for the operator to dodge from one side to the other, as he encounters corn-hills out of line, by a simple guidance of the steering wheels, rather than by forcibly shifting the gangs to one side or the other on the main frame. And in so guiding the implement, concurrently with the guidance of the tractor, there is comparatively slight shifting of the course of its propelling "bull-wheels". The action is therefore much quicker than the corresponding action would be in the case of a trailing cultivator, and with less danger of either uprooting or covering hills of corn.

The invention is fully disclosed in the description and claims following, reference being had to the accompanying drawings, in which:—

Fig. 1 is a side elevation of the improved cultivator as in use. Fig. 2 is a fragmentary view in perspective showing means for shifting the plows sidewise on the main frame. Fig. 3 is a similar view, showing the mechanism for raising and depressing the plows. Fig. 4 is a similar view, showing the steering gear as applied to the implement. Fig. 5 is a plan view of the cultivator and the front end of the tractor. Fig. 6 shows in perspective the device for shifting the drive-gears of the tractor. Fig. 7 shows in perspective one of the foot-lever connections with the implement steering-gear. Fig. 8 is a plan view of the invention as modified for the cultivation of two rows of corn. Fig. 9 shows diagrammatically the operation of the steering gear as to both the implement and the tractor.

In the drawings, the numeral 5 denotes a well-known farm tractor, shown conventionally and $5^a$, $5^b$ indicate respectively the rear driving and front steering wheel or wheels of the tractor. This has its own clutch-lever 6, normally operated by the foot, and at the other side its gear-shift lever 7, which has the usual compound movement in shifting gears. To give a better leverage to the clutch-lever in operating it from in front of the tractor it is provided with a depending bracket $6a$. The mechanism for operating these tractor controls will be described presently.

The implement attachment comprises parallel push or side-bars 8 to which is secured a transverse member, here shown as a long cross-bar 9, which serves as the main support for a pair of steering wheels 10 for the implement attachment. These wheels are carried on spindles 11 journaled in vertical bearings at the end portions of the transverse member 9, and provided with forwardly extending cranks $11a$. A diagonal brace 12, in the case of the two-row cultivator, or a pair of them in the three-row machine, gives rigidity to the main frame of the cultivator attachment.

To the main cross-bar or transverse member 9 is attached, as by brackets 13, a channel-bar 14, which serves as the front end support for the plow gangs 15. The middle pair of plows is carried rockably by coupling joints 16 on a shaft 17 rigidly attached to the channel by stirrups 18 made fast to the shaft, as by welding. The outer shafts 19 carry plows in a similar way, but are made slidable a limited distance parallel with the channel. The stirrups 18a are made fast to the shafts, but may themselves slide lengthwise of the channel, which they straddle, and carry anti-friction rollers 20 underneath (Fig. 2). The shafts themselves ride on spool-like rollers 21 running freely in the channel raceway.

The plows are coupled in pairs by the usual arches 22, and may be differentially spaced by shifting the arches in holes in the plow-connecting plates 23. The laterally shiftable gangs connect by their arches and bifurcated links 24 with track-rails 25 of a rocker frame adapted for tilting up or down to raise or depress the plows. This frame comprises end-bars 26 and 26a, the former being a hand-lever engageable with a sector 27 secured to a rock-shaft 28 journaled in standards 29c secured to the main cross-bar 9. In the three-row machine there are two of these rocker-frames. Their rock-shafts are aligned with the middle rock-shaft 28a, and engage the same operably by connecting stud-bearing 28b, as shown in Fig. 3. A sleeve 29 on the middle shaft, provided with a hand-lever and engaging the adjacent sector 29a serves for elevating and depressing the middle gang of plows through the arm 30 and connecting link 31. It is to be understood that all three of these sectors are made fast to the middle rock-shaft, as by welding. It is evident, therefore, that when all of the hand-levers are in locking engagement with their sectors the rock-shafts are all (or both) rigidly connected and turn as a single unit. At the same time, any one of the hand-levers may be operated independently to raise or depress any plow-gang.

In turning at the ends of rows, and in traveling from field to field, all the gangs should be raised. For this purpose one of the rock-shafts is provided with a crank-arm 32, which is connected by a link 33 with a hand-lever 34 engaging a sector 35 attached to the main frame. This, as will be evident, is a master lever, and holds the rock-shafts carrying the sectors above mentioned in a definite position to support the plow-gangs at all times.

In order that the side gangs may be shifted sidewise, the forked links 24, which carry anti-friction rollers 24a, are connected with the coupling shafts 19 operably by bridges 36. These have a turnable connection with the shafts, but are made fast to said links. At the front ends they connect by links 37 with one of each pair of stirrups 18a, by stud-bolts 38. Holes 39 in these links permit the shifting of the bridges to correspond with any necessary shifting of the plow arches in changing the spacing of the plows. As the bridge rocks when the rocker frame is rocked, the holes in the links are slotted, so that the links themselves may turn a limited distance without twisting. The bridges connect by links 40 with hand-levers 41 co-operating with fixed sectors 42. By this means either gang may be moved at will, the plows being carried in a parallel position to the right or left.

The implement frame above described is coupled to the tractor for vertical swinging movement by its parallel bars 8 engaging studs 43, which as brackets are bolted to the tractor crank-case preferably midway between the front and rear wheels of the tractor, by one or more of the tractor's own bolts. Rearwardly extending straps 44 connect with the studs and are bolted at 45 to the rear axle housing by other of the tractor's bolts, thus providing adequate resistance to the thrust of the machine. Between the side-bars 8 and the tractor radiator are interposed wearing-blocks 46, which permit the frame to play up and down, but prevent lateral movement.

On a cross-bar 47 carried by the cultivator attachment in front of the tractor is mounted the driver's seat 48. A suitable back for this seat, 49, is mounted in front of the radiator. This should be of wood, or the like, so as to shield the operator from the heat of the radiator when he leans back.

A hand-lever 50 mounted on the main cultivator frame connects by a rod 51 with the clutch-lever bracket 6a above mentioned. By this means the clutch is easily released.

A rockable and slidable cranked lever 52, carried in bearings 53 and 54, connects with the upper end of the tractor gear-shift lever. By means of the hand-lever 55, which is within easy reach of the driver as he sits, the gears may be shifted as desired.

Provision is made for steering the tractor and the implement attachment positively and concurrently. For this purpose a pair of foot-levers 56 are hung from standards 57 secured to the attachment frame. At the front end of the frame is a transversely disposed bridge 58, which serves as the upper bearing for a vertical rock-shaft 59. The lower end of this shaft is carried by a bearing member 60 secured to the channel-bar 14 (see Fig. 4). The shaft 59 carries a crank 61, preferably at its lower end, and this connects by a rod 62 with the steering arm 63 of the steering wheel 5b of the tractor. To the upper end of the rock-shaft 59 is attached a double lever 64, and this connects by link-rods 65 with the foot-levers 56 above mentioned. The tractor may thus be guided by operating the foot-levers alternately. The same foot-levers are employed to steer the implement attachment, but through the medium of special steering mechanism.

Referring to Fig. 9 the steering of the apparatus as a whole is illustrated conventionally. It will be noted that all of the wheels move in different arcs, the common center of which is placed at C in Fig. 8. It will further be noted that no two of the wheels stand at the same angle to the transverse member or axle on which the wheels are mounted. This is especially true of the implement wheels, one of which is at a much sharper angle to such line than the other. This ideal and proper position in turning is made possible by the use of apparatus now to be described.

The forwardly extending cranks 11ª carried by the spindles of the steering wheels 10 of the implement attachment are connected by a tie-rod 66. This is necessarily an extensible or slip-rod, one of its members sliding telescopically with respect to the other, as shown in Fig. 4. Connecting with each part of the compound tie-rod is a connecting-rod 67, the adjacent ends of which rods engage in slots 68ª in a crank-arm 68 fixedly secured to the rock-shaft 59. This arm is slotted so that the connecting-rods may play in and out a limited distance radially with respect to the crank-arm. This slippage of the connecting-rods compensates for the longer and shorter arcs of movement of the steering arms or crank 11ª, and so not only permits the wheels to take the proper positions, as shown in Fig. 9, but positively forces them to take such positions. To give positive effect to the movement, the connecting-rods are provided with double springs 69 mounted on slip-rods 70 pivotally connecting with the connecting-rods, and slidable in the pivoted guides 71 mounted on the extensions 60a of the bearing member 60. These springs tend to hold the connecting-rods normally, i. e., when the steering wheels are directed straight ahead, at the outer ends of their respective slots, which in the present instance is their rearward ends, as best shown in Fig. 5. When the crank arm 68 turns in steering the combined machine, the springs 69 of each pair serve to hold the connecting rod 67 at the inside of the turn, which is the pushing rod, at the outer end of its slot 68ª, and to move the other connecting rod 67, which is the pulling rod, to an intermediate position in its slot 68ª, as shown in Fig. 4. The movement thus imparted to the steering wheels of the attachment is differential in character, the wheel at the inside of the turn being turned to a much sharper angular position with respect to the transverse member 9 than the other wheel, as more fully set forth in my pending application, Serial No. 160,188, filed January 10, 1927, as a division of this application. For the purposes of this case it will suffice to say that the steering mechanism operates to cause the inside wheel of the attachment to travel in an arc concentric with the theoretical center of the turning movement, whereas the outside wheel will be turned through a somewhat greater angle than that necessary to cause it to travel in an arc about such center, to throw more of the traction on the latter wheel and thereby aid in the steering operation. By appropriately adjusting the springs 69, however, the outside wheel may also be caused to travel in a concentric arc, if desired.

It is to be noted that in the case of a two-row cultivator there is much less side-draft than there would be with a cultivator trailing behind the tractor, due mainly to the fact that the plows are farther from the tractor's driving or propelling wheels, and the angle of propulsion to the line of advance is considerably more acute than the angle of draft in the case of a trailing implement.

I claim:

1. Combined with a tractor a gang cultivator disposed forwardly thereof, having guide-wheels and means for guiding them, a channel bar with rollers mounted therein, shafts carried on said rollers and separately and independently connecting with pairs of cultivators, levers adapted to laterally shift said gangs separately and independently and links connecting the levers with said gangs.

2. Combined with a tractor a forwardly disposed cultivator frame having a channel bar with anti-friction rollers disposed therein, coupling shafts mounted on said rollers, cultivators carried by said shafts, pivoted rocking frames adapted to support the gangs rearwardly, levers adapted to raise and depress said rocking frames, levers adapted to shift the rocking frames laterally and connecting links therefor.

3. Combined with a tractor, a forwardly disposed cultivator having gangs of plows mounted shiftably sidewise on the cultivator frame, rocker frames serving as supports for pairs of said plows, sectors adjacent to said rocker frames, co-operating levers, an intermediate pair of plows, independently liftable, an independent lever and a sector therefor, the last named lever being adapted to elevate and depress all the plows concurrently when locked in any positon by their respective levers and sectors.

4. In a tractor driven cultivator the combination of a carrying frame, plow gangs hung therefrom, supporting rocker frames carried by the main frame and adapted to permit the lateral shifting of the gangs thereon, shift-levers carried by said rocker frames, supporting sectors an intermediate rock-shaft and lever adapted for raising and lowering the middle pair of gangs, a sector and lever therefor and an independent lever carried pivotally by said middle rock-shaft and connecting operatively with said rock-shaft and rocker frame whereby all of the gangs may be elevated and depressed concurrently.

5. In a tractor-driven cultivator having gangs of plows coupled in pairs and pivotally mounted at the front, independent rocker frames to support the plow pairs rearwardly, lift-levers therefor, an intermediate rockshaft carrying sectors for the rocker-frame levers, a lift-lever for the intermediate plow pairs rockable on said intermediate shaft, and means operable by the operator for actuating the intermediate shaft, whereby any pair of plows may be elevated or depressed independently, or all simultaneously.

6. In a tractor-driven cultivator having pairs of plows pivotally liftable forwardly, supporting and connecting shafts adapted for shifting sidewise, rocker frames provided with track-bars, suspending links carrying rollers to run on said track-bars, and connecting with the plows, and levers operable by the operator to shift the plows laterally, and to move them up and down.

7. In a tractor-driven cultivator having plow-pairs connected forwardly and pivotally liftable, rocker-frames provided with track-bars, links connecting the plow-pairs slidably with the track-bars, bridges connecting said links and the front ends of the plows, and levers controlled by the operator, and adapted to shift the plows laterally and raise and depress said rocker-frames.

8. In a tractor-driven cultivator, a main frame, a channel-bar carried thereby, rollers running therein, a shaft borne by said rollers, plows connected by said shaft, stirrups secured to the shaft and engaging the channel underneath, and a lever accessible to the operator whereby the shaft and connected plows are shifted laterally.

9. The combination with a tractor comprising a tractor frame supported on front steering wheels and rear driving wheels, and means operable to steer said steering wheels, of a cultivator attachment comprising a transverse member extending laterally beyond the sides of the tractor and disposed in front thereof, wheels connected with and supporting the end portions of said transverse member, push members rigidly connected at the front with said transverse member and pivotally connected with the tractor at opposite sides thereof back of the tractor steering wheels to swing vertically, means for holding said push members against lateral movement with respect to the tractor, and cultivator rigs connected with said transverse member to move laterally with respect to said push members and to the tractor.

10. The combination with a tractor comprising a tractor frame supported on front steering and rear driving wheels, and means operable to steer said steering wheels, of a cultivator attachment comprising a transverse member extending laterally beyond the sides of the tractor and disposed in front thereof, wheels connected with and supporting the end portions of said transverse member, push members rigidly connected at the front with said transverse member and pivotally connected with the tractor at opposite sides thereof to swing vertically, and cultivator rigs connected with said transverse member to move laterally with respect to said push members and to the tractor, and adapted to cultivate the soil between the paths traversed by the tractor steering wheels and the wheels of the cultivator attachment adjacent thereto respectively.

11. The combination with a tractor comprising a tractor frame supported on front steering and rear driving wheels, of a cultivator attachment comprising a front transverse member, push members rigidly connected at the front with said transverse member and pivotally connected at the rear with opposite sides of the tractor for vertical swinging movement with respect thereto, wheels connected with and supporting the end portions of said transverse member, cultivating rigs disposed back of said transverse member and forward of the tractor and connected with said transverse member to swing vertically into or out of engagement with the ground, and to move laterally with respect to said push members and to the tractor, and means operable to steer said steering wheels.

12. A cultivator attachment for tractors, comprising a transverse member, push members rigidly connected with said transverse member and adapted to pivotally connect the same with the tractor for vertical movement with respect thereto, wheels connected with and supporting the end portions of said transverse member, and a straddle row cultivating implement attached to said transverse member for lateral movement with respect to said push members and to the tractor.

13. A cultivator attachment for tractors, comprising an elongated transverse member, push members rigidly connected with said transverse member and adapted to pivotally connect the same with the tractor for vertical movement with respect thereto, dirigible wheels connected with and supporting the end portions of said transverse member, a straddle row cultivating implement attached to said transverse member for lateral movement with respect to said push members and to the tractor, and means on said attachment for operatively connecting said dirigible wheels to be steered in conjunction with the steering of the tractor.

14. The combination with a tractor comprising a tractor frame, steering wheels connected with and supporting the front portion of said frame, means operable to steer said wheels, and rear driving wheels arranged to travel in the spaces between plant rows, of a cultivator attachment comprising a transverse member extending laterally beyond the sides of the tractor and disposed in front thereof, dirigible wheels connected with and supporting the end portions of said transverse member, push members rigidly connected at the front with said transverse member and extending back along the opposite sides of the tractor between the steering wheels thereof, and pivotally connected with opposite sides of the tractor back of said steering wheels to swing vertically, cultivator rigs connected with said transverse member to swing vertically and to move longitudinally of said transverse member, said rigs being positioned to straddle and cultivate rows lying between the paths traversed by the driving wheels of the tractor and the wheels of the cultivator attachment adjacent thereto, respectively, means operable to shift said rigs along said transverse member, and means operable to steer the dirigible wheels of the cultivator attachment.

15. A cultivator attachment comprising a frame having a channel bar with anti-friction rollers disposed therein, coupling shafts mounted on said rollers, cultivators carried by said shafts, pivoted rocking frames adapted to support the cultivators rearwardly, levers adapted to raise and depress said rocking frames, levers adapted to shift the rocking frames laterally, connecting links for the latter levers, and wheels supporting the end portions of said frame.

16. A cultivator attachment comprising a frame having a channel bar with anti-friction rollers disposed therein, coupling shafts mounted on said rollers, cultivators carried by said shafts, pivoted rocking frames adapted to support the cultivators rearwardly, levers adapted to raise and depress said rocking frames, levers adapted to shift the rocking frames laterally, connecting links for the latter levers, dirigible wheels supporting the end portions of said frames, and means operable to steer said wheels.

17. A cultivator attachment comprising a cultivator frame, gangs of soil tilling rigs mounted on said frame to shift sidewise thereon, rocker frames serving as supports for pairs of said rigs, sectors carried by said rocker frames, cooperating levers, an intermediate pair of soil tilling rigs independently liftable, an independent lever and a sector therefor, the last-named lever being adapted to elevate and depress all the rigs concurrently when locked in any position by their respective levers and sectors, dirigible wheels supporting said cultivator frame, and means operable to steer said wheels.

18. A cultivator attachment comprising a frame, dirigible wheels supporting the end portions thereof, a plurality of soil tilling rigs connected with said frame and shiftable longitudinally thereof, said rigs being movable vertically independently of each other, means operable to shift said rigs longitudinally, devices operable either to lift the rigs separately or in unison, means operable to steer said wheels, and push bars connected with said frame and adapted to be pivotally connected with opposite sides of a tractor to permit the cultivator frame to rise and fall with respect to the tractor.

In testimony whereof I affix my signature.

FRANK T. COURT.